United States Patent [19]

Nagao et al.

[11] Patent Number: 5,481,340
[45] Date of Patent: Jan. 2, 1996

[54] IMAGE FORMING APPARATUS

[75] Inventors: Yoshinori Nagao, Yokohama; Koji Amemiya, Tokyo; Masami Izumizaki; Nobuatsu Sasanuma, both of Yokohama, all of Japan

[73] Assignee: Canon Kabushiki Kaisha, Tokyo, Japan

[21] Appl. No.: 267,719

[22] Filed: Jun. 29, 1994

[30] Foreign Application Priority Data

Jun. 30, 1993 [JP] Japan .................. 5-183274

[51] Int. Cl.⁶ ............................ G03G 21/00
[52] U.S. Cl. ............................ 355/246; 355/208
[58] Field of Search ............................ 355/203, 204, 355/207, 208, 245, 246, 214, 326 R, 327; 346/160, 160.1; 118/689, 691

[56] References Cited

U.S. PATENT DOCUMENTS

| | | | |
|---|---|---|---|
| 4,277,162 | 7/1981 | Kasahara et al. | 355/208 |
| 4,349,741 | 9/1982 | Bobart et al. | 347/107 X |
| 4,449,052 | 5/1984 | Krieg | 347/107 X |
| 4,607,944 | 8/1986 | Rushing | 118/691 X |
| 4,709,250 | 11/1987 | Takeuchi | 346/160 |
| 4,751,377 | 6/1988 | Ishizaka et al. | 355/67 X |
| 5,155,529 | 10/1992 | Rushing | 355/246 X |
| 5,294,959 | 3/1994 | Nagao et al. | 355/208 |
| 5,307,119 | 4/1994 | Folkins et al. | 355/208 |
| 5,359,400 | 10/1994 | Itoh et al. | 355/208 X |
| 5,376,956 | 12/1994 | Nagao et al. | 355/208 X |

*Primary Examiner*—Matthew S. Smith
*Attorney, Agent, or Firm*—Fitzpatrick, Cella, Harper & Scinto

[57] ABSTRACT

An image forming apparatus for controlling image forming conditions regarding the image quality comprises an image forming unit to form an image onto a recording medium such as a paper, a generator to generate pattern data to form an image of a stripe pattern of a predetermined interval by the image forming unit, a reader to read the stripe pattern image which is formed by the image forming unit in accordance with the pattern data which is generated from the generator, a memory to store the stripe pattern image read by the reader, a detector to detect the interval of the stripes of the stripe pattern stored in the memory, and a controller to control the image forming unit on the basis of the stripe interval detected by the detector.

27 Claims, 12 Drawing Sheets

22a

1/200 INCH

MAIN SCANNING DIRECTION

SUB SCANNING DIRECTION

1/200 INCH

23

24

25

ON

OFF

14 CCD SENSOR

IMAGE FORMING APPARATUS

BACKGROUND OF THE INVENTION

1. Field of the Invention

The invention relates to an image forming apparatus for controlling image forming conditions regarding an image quality.

2. Related Background Art

FIG. 15 is a cross sectional view of a main section for explaining a construction of an image forming apparatus and shows the image forming apparatus for forming a color image by sequentially transferring developing agents of yellow, magenta, cyan, and black.

In the diagram, reference numeral 1 denotes a photosensitive drum as an image holding material. The drum 1 rotates clockwise toward the drawing. Reference numeral 2 denotes a charging unit to uniformly charge the surface of the photosensitive drum 1. The charging unit 2 is constructed by a charging line 2a and a grid 2b. Reference numeral 8 denotes a discharging lamp for exposing the whole surface of the drum 1, thereby allowing the surface potential of the drum 1 to approach a potential near 0 V at the front stage of the charging by the charging unit 2. Reference numeral 3 denotes an optical system comprising a laser light source, a collimating lens, a polygon mirror, and the like.

Reference numeral 4 denotes a developing unit to form a visible image from a latent image on the photosensitive drum 1 by a toner. Reference numeral 4M denotes a magenta developing unit; 4Y a yellow developing unit; 4C a cyan developing unit; and 4K a black developing unit. Reference numeral 5 denotes a cleaner to collect the toner remaining on the surface of the drum 1; 6 a transfer conveying apparatus (transfer drum) of the drum type for holding a recording material (transfer material) P by a drum-shaped transfer sheet and for transferring the toner image on the drum 1 onto the recording material P while conveying the recording material P; 7 a transfer charging unit; 10 a toner density sensor for detecting a mixture ratio of the toner and carrier for image formation which are stored in the developing unit 4; 11 a surface potential detector (potential sensor) for detecting the surface potential of the photosensitive drum 1; 17 a photoelectric sensor for reading an amount of reflected light of a test patch (test pattern) 22 which was irradiated onto the drum 1 by an LED illuminating apparatus 12; 16 a density converting circuit for converting a voltage generated from the photoelectric sensor 17 into density information; and 100 a control circuit for managing each of the above detection information and controlling each image forming condition.

The operation of each section will now be described hereinbelow.

First, when the surface of the photosensitive drum 1 is uniformly charged by the charging unit 2, a light image is exposed by the optical system 3. However, the light image is read by an original reading apparatus (scanner; not shown) and is exposed on the basis of the image processed signal. An electrostatic latent image is formed on the drum 1 by the exposure of the light image. The latent image is subsequently developed by the toner of the developing unit 4 and a visible image is derived. After that, the toner image is transferred to the recording material P by the transfer charging unit 7. The above processes are sequentially executed every four colors of yellow, magenta, cyan, and black, so that a full color image is obtained.

On the other hand, an output of the test patch 22 is indicated at a predetermined interval from the control circuit 100 and the test patch 22 is formed onto the drum 1 in a manner similar to the above processes. The test patch 22 is constructed by one or a plurality of patches having predetermined densities. A toner density of the test patch 22 detected by the photoelectric sensor 17 is arithmetically operated by the control circuit 100, thereby controlling image forming means, for example, a charging potential, a density conversion table (LUT), a toner density in the developing unit, a transfer current, and the like.

In the above kind of image forming apparatus, the above various kinds of controls for stabilization of the picture quality are executed at every interval during which a predetermined number of images are formed and each time a power source of the apparatus is turned on.

However, in case of executing a feedback control which changes developing conditions which exert an influence on the picture quality, in order to perform the control at a higher precision, it is necessary to further detect the image forming state in a micro state. According to the above construction, however, since the photoelectric sensor is used as a patch sensor, the reflected light amount of the whole test patch can be merely detected and there is a problem such that information which is effective to the feedback for setting the developing conditions cannot be obtained. Particularly, with respect to the defective reconstruction of a highlight portion which exerts a large influence on the image picture quality, information for the feedback control cannot be detected by the above test patch method.

On the other hand, at the timing for executing the above various kinds of controls for stabilization of the picture quality, a control for a change in state of the transfer material is not performed. Even when the toner density level of the toner image on the image holding material or the transfer drum is proper, when the paper in which a hygroscopic property actually changes is printed, the apparatus cannot rapidly made correspond to such a paper.

Further, in spite of the fact that the apparatus has characteristics such that the transfer efficiency is most easily changed in accordance with an environmental change of one day, there is also a problem such that when the conditions of the transfer efficiency are merely set on the basis of the number of transfer materials which are consumed, a clear image cannot stably be formed or the like.

SUMMARY OF THE INVENTION

It is an object of the invention to provide an image forming apparatus which can eliminate the above drawbacks.

Another object of the invention is to provide an image forming apparatus in which a pattern image which is obtained by developing a pattern formed on an image holding material is finely detected, image conditions are corrected, and a timing for starting the correction is controlled, so that an image of a high picture quality which is not influenced by an environmental fluctuation can be stably formed.

The above and other objects and features of the present invention will become apparent from the following detailed description and the appended claims with reference to the accompanying drawings.

DETAILED DESCRIPTION OF THE PREFERRED EMBODIMENTS

First Embodiment

Figure 1:
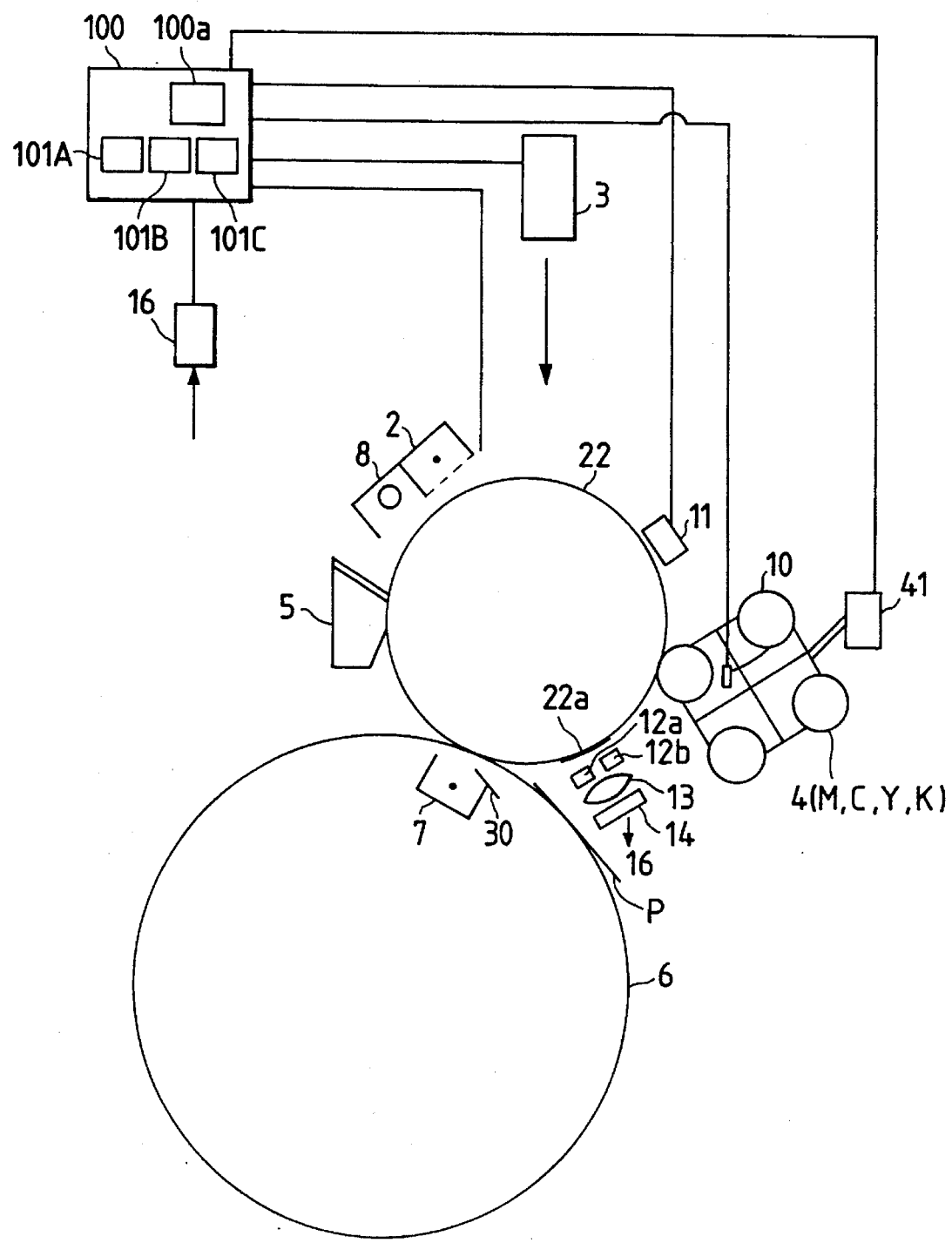
FIG. 1 is a cross sectional constructional diagram of a main section for explaining a construction of an image forming apparatus showing the first embodiment of the invention.
Figure 15:
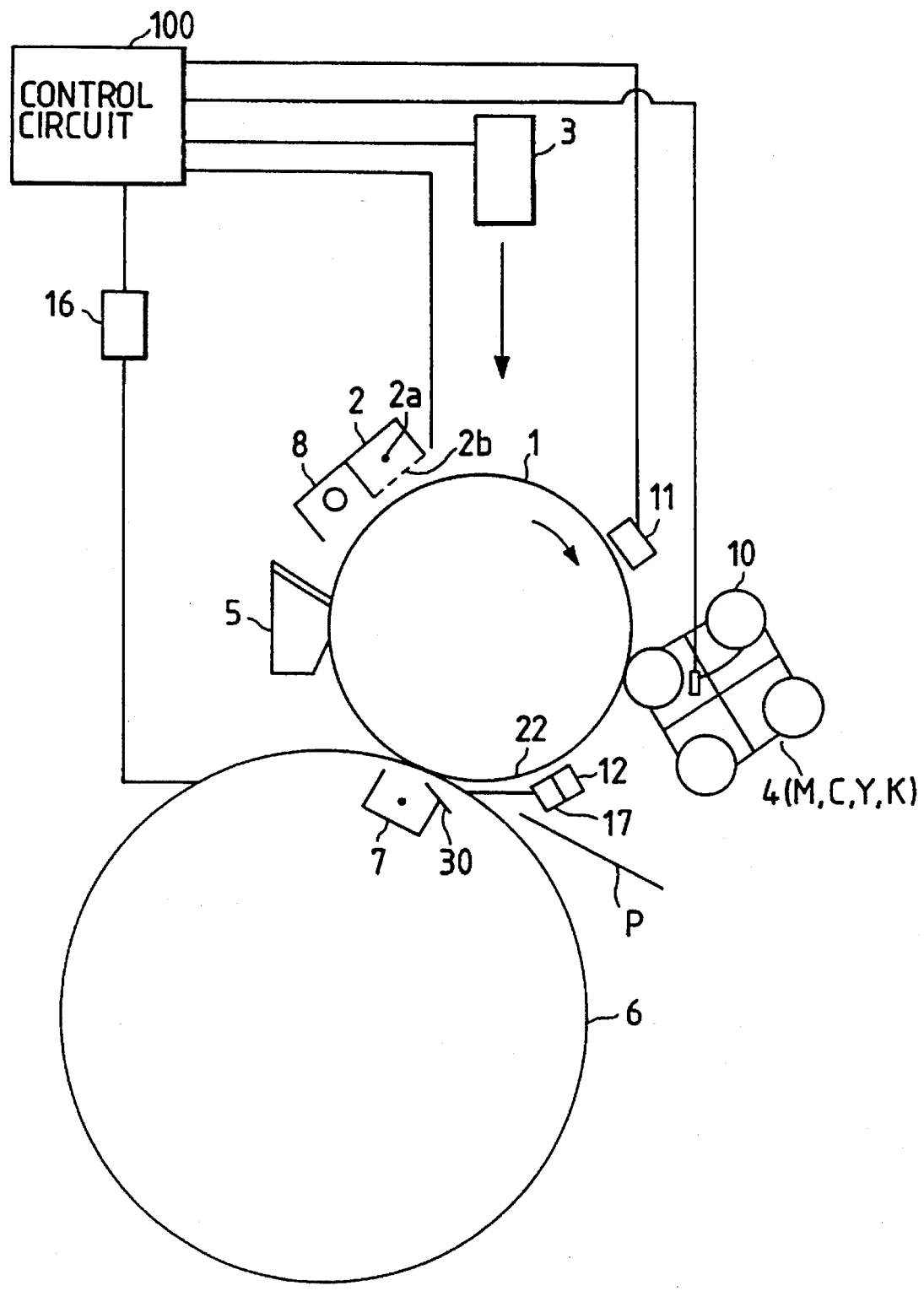
FIG. 15 is a cross sectional view of a main section for explaining a construction of a conventional image forming apparatus.

FIG. 1 is a cross sectional constructional diagram of a main section for explaining a construction of an image forming apparatus showing the first embodiment of the invention and the same portions as those shown in FIG. 15 are designated by the same reference numerals.

In the diagram, reference numeral 14 denotes a CCD sensor to detect a modulation transfer function. The CCD sensor 14 is constructed in a manner such that a predetermined patch 22a on the photosensitive drum 1 is exposed by light sources 12a and 12b and their reflected lights are formed as images onto the CCD 14 through a lens 13. Each of the light sources 12a and 12b is constructed by a halogen lamp whose luminance change is small and exposes the patch through a filter (not shown) to cut lights of wavelengths which are equal to or less than a short wavelength of 600 nm so as not to give a damage to the photosensitive drum 1. The CCD sensor 14 is constructed so that it can read the reflected light amount from a microregion of, for example, 30 μm×30 μm of the photosensitive drum. The control circuit 100 comprises a CPU 101A, an ROM 101B, an RAM 101C, and a memory circuit 100a. Data which is output from the CCD sensor 14 is stored into the memory circuit 100a. The CPU 101A performs a control in a manner such that a laser beam is irradiated from the optical system 3 on the basis of pattern data stored in the ROM 101B and the latent image of the patch 22a is formed on the photosensitive drum 1 and is developed by the toner. The CPU 101A analyzes a line width distribution status on the basis of a correction processing program (shown in FIG. 5, which will be explained hereinlater) stored in the ROM 101B and controls an amount of silica fine grain which are added to the developing unit 4.

Reference numeral 41 denotes a silica fine grain reserve tank. As will be explained hereinlater, when the control circuit 100 detects a defective image of the highlight portion, namely, it detects a standard deviation of 6.0 or more of a histogram, the control circuit 100 controls the reserve tank 41 and adds the silica fine grain to the developing unit 4.

Figure 2A:
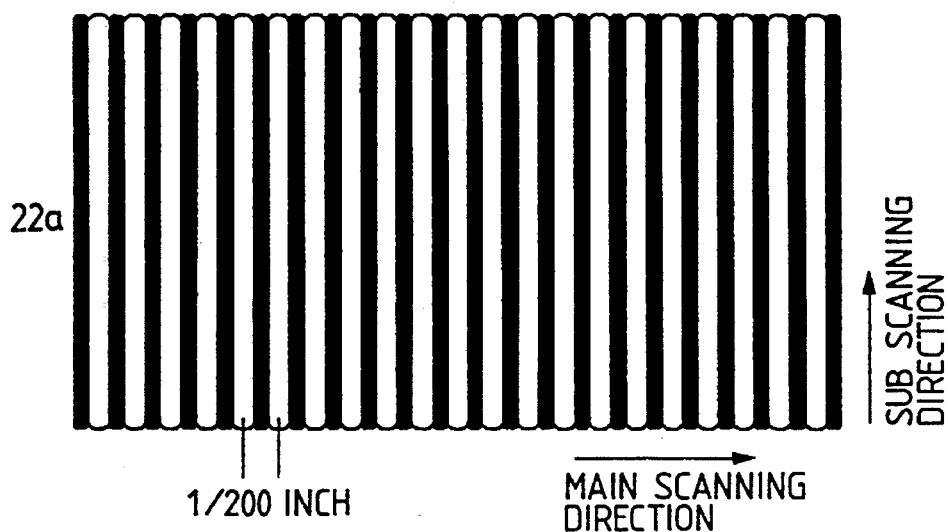
FIGS. 2A, 2B, and 2C are diagrams for explaining a construction of a patch pattern which is formed on a photosensitive drum shown in FIG. 1.
Figure 2B:
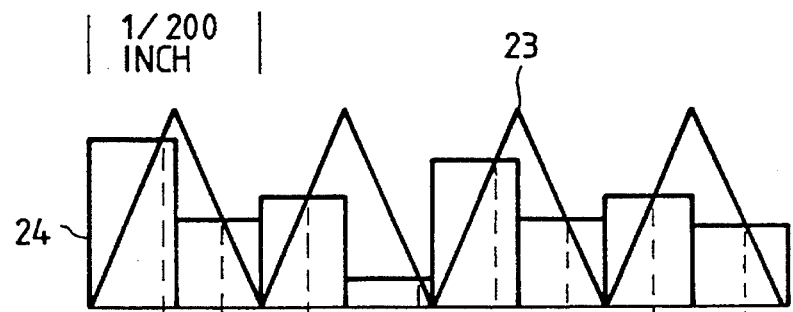
Figure 2C:
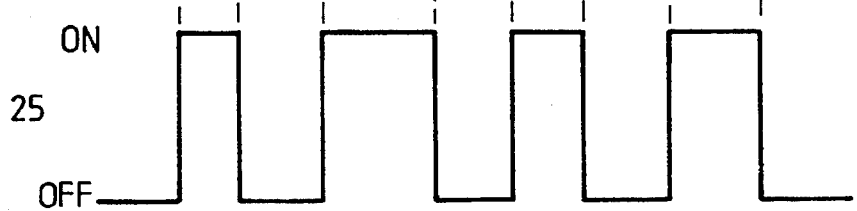

FIG. 2A is a diagram showing a patch pattern which is formed on the drum 1 shown in FIG. 1. The patch 22a is formed as follows. On the basis of a triangular wave 23 shown in FIG. 2B having a period of 200 lpi (lines per inch) and an image signal 24, an image recording signal 25 is formed from the overlap portion of both waveforms 23 and 24 as shown in FIG. 2C by, for example, a PWM (Pulse Width Modulation) as a method of expressing a continuous gradation. On the basis of the image recording signal 25, the optical system 3 exposes the photosensitive drum 1. The latent image formed by the exposure is developed by the developing unit 4, so that the patch 22a as a vertical stripe-like pattern of a resolution of 200 lpi and a density level of 80 is formed.

The reading operation of the patch 22a by the CCD sensor 14 will now be described.

The CCD sensor 14 is driven at a predetermined frequency. The driving frequency is determined by the size of one pixel constructing the CCD sensor 14, optical magnification, and conveying speed of conveying means (although it shows the transfer drum 6 in the embodiment, a transfer belt or an intermediate transfer material can be also used). For example, in the case where the size (length in the sub scanning direction x length in the main scanning direction) of one pixel of the CCD is set to 18 μm×13 μm and the optical magnification is set to 1:1 and the conveying speed is set to 120 mm/sec, the frequency of a CCD driving clock is equal to 123.4 nsec. This CCD clock frequency is also used as a frequency of a memory driving clock even when the CCD signal is stored into the memory circuit 100a. When the optical image of the patch 22a is projected onto the CCD sensor 14, the CCD sensor 14 generates a voltage which changes in accordance with the dark and light of the optical image. The output voltage from each pixel of the CCD 14 is sequentially converted into the 8-bit digital data on a line unit basis. After that, the digital data is stored into the memory circuit 100a, which will be explained hereinlater. In this case, it is desirable to add a circuit to eliminate a reset signal included in the CCD output.

Figure 3:
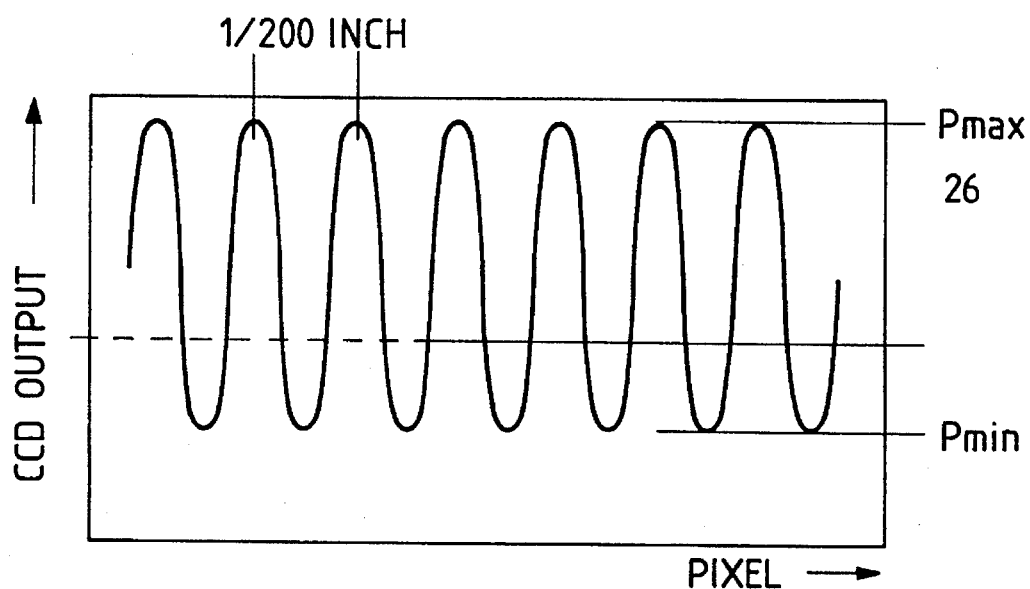
FIG. 3 is a diagram showing a storing state after a patch pattern was stored into a memory circuit shown in FIG. 1.
Figure 4:
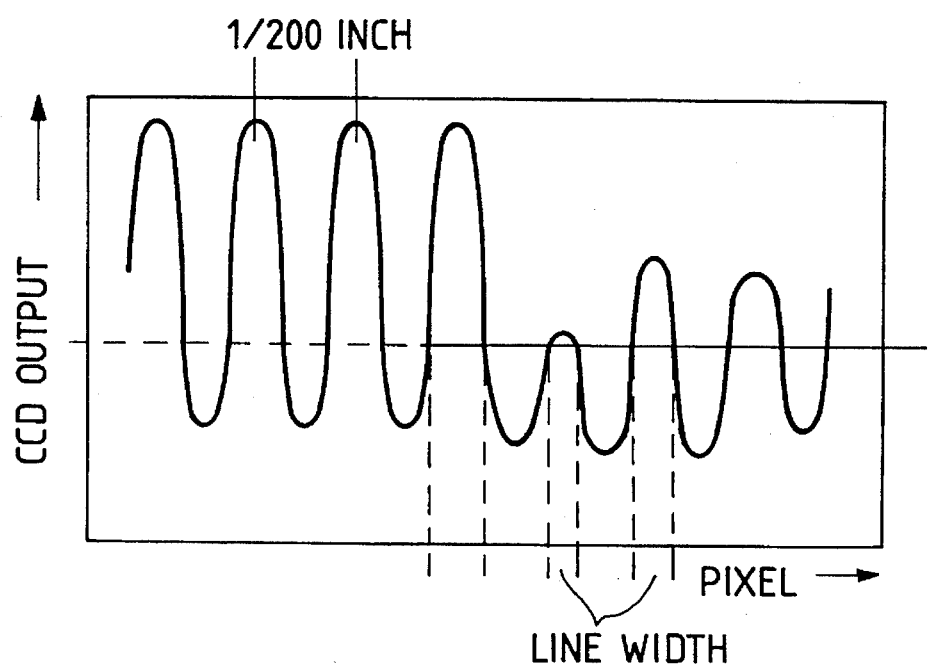
FIG. 4 is a diagram showing a storing state after a patch pattern was stored into the memory circuit shown in FIG. 1.

FIGS. 3 and 4 are diagrams showing storing states after the patch pattern was stored into the memory circuit 100a shown in FIG. 1.

In the diagram, Pmax corresponds to a portion of the line of the patch 22a and Pmin corresponds to a portion between the lines of the patch 22a.

As shown in the diagram, a PWM pattern of the test patch 22a is reconstructed in the memory circuit 100a. In an ideal image forming apparatus, the pattern is reconstructed so as to have almost the same width as the line width of PWM pattern in the diagram. However, in a state in which a defective image of the highlight portion occurs, the line width becomes uneven. In the invention, the line width is detected by using the CCD sensor 14, thereby judging whether the image of the highlight portion could be correctly reconstructed or not.

A method of measuring the line width will now be described with reference to FIGS. 3 and 4 and the like.

Actually, the value which is obtained by 8-bit converting the output signal of the CCD has been stored in the memory circuit 100a. Each line width is subsequently detected on the basis of the memory address of the stored data. A process to form a histogram for each line width is executed. Particularly, FIG. 3 shows a state of the line width in a state of a good reproducibility. FIG. 4 shows a state of the line width in a state of a defective reproducibility. On the histograms, there is a difference such that a density distribution of the microportion forming the line width in case of the former histogram lies within a narrower range than that in case of the latter histogram. Such a line width distribution status can be expressed by a standard deviation of the histogram. The values of the standard deviation shown in the embodiment are equal to "5.6" in case of the optimum image forming state and to "7.8" in case of the defective image forming state. By comparing the value with the value of the preset standard deviation as mentioned above, the image reproducibility of the highlight portion can be judged. In the step of obtaining the standard deviation, it is also possible to fetch data at a plurality of positions and to use the average value of them.

A feedback method for the developing conditions when it is judged that a defective image forming state occurred will now be described with reference to a flowchart shown in FIG. 5.

Figure 5:
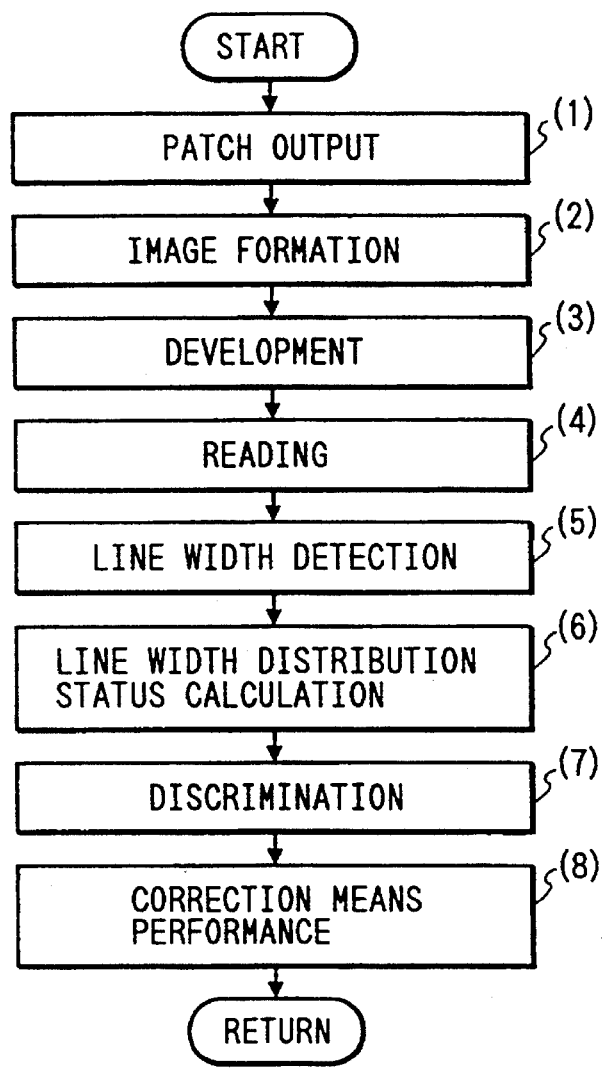
FIG. 5 is a flowchart showing an example of a developing condition correction processing procedure in the image forming apparatus according to the invention.

FIG. 5 is a flowchart showing an example of a processing procedure for correcting the developing conditions in the image forming apparatus according to the invention. (1) to (8) indicate processing steps.

First, the CPU 101A outputs yellow patch data to the optical system 3 (step 1), thereby forming a patch latent image (2). The latent image is developed by the developing unit 4 (3). The patch 22a formed on the photosensitive drum 1 is read by the CCD 14 (4). The patch data is stored into the memory circuit 100a. The data is read out and the line width is detected (5). The line width distribution status is derived from the standard deviation of the histogram (6) and is compared with the value of the preset standard deviation, thereby judging the image reproducibility of the highlight portion (7). When a value which is equal to or larger than the standard deviation "6.0" of the histogram is detected, the CPU 101A generates an addition control signal to the silica fine grain reserve tank 41 to thereby add the silica fine grain to the developing unit 4 and corrects the image forming conditions (8). The processing routine is subsequently returned. The above processes are also similarly executed with respect to magenta, cyan, and black.

When the defective image of the highlight portion, namely, the value that is equal to or larger than the standard deviation "6.0" of the histogram is detected, a supplying apparatus provided for the silica fine grain reserve tank 41 operates so as to add the silica fine grain to the developing agent. The silica fine grain of a predetermined weight %, for instance, 0.1 weight % of all of the developing agent is added. By such an operation, a flowability of the toner can be improved and the defective image of the highlight portion can be improved.

Second Embodiment

Figure 6A:
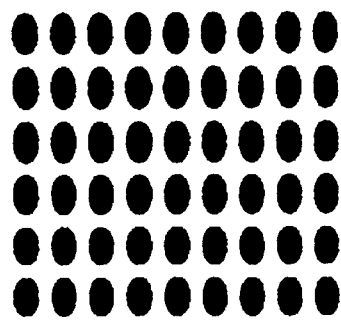
FIGS. 6A and 6B are diagrams showing an image improving state in an image forming apparatus showing the second embodiment of the invention.
Figure 6B:
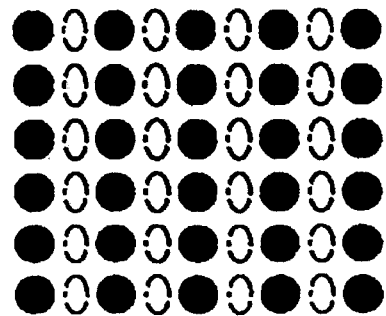

FIGS. 6A and 6B are diagrams showing an image improving state in an image forming apparatus showing the second embodiment of the invention.

At the time of the ordinary image forming state, as shown in FIG. 6A, the image exposure is executed with the light amount corresponding to the image density every pixel. In the embodiment, however, as shown in FIG. 6B, the data of the first and second pixel is added, the exposure is performed by the light amount based on the resultant data, and as for the next exposure of the second pixel, since it has already been exposed together with the first pixel, the exposure is not executed (portion shown by a broken line in FIG. 6B). With respect to the third and fourth pixels as well, processes are executed in a manner similar to the first and second pixels. That is, the sampling operation is executed on a 2-pixel unit basis and the exposure is performed every other pixel. By executing such processes, a size of sole dot increases, the latent image is stably formed, and a visual highlight density is maintained because of the exposure is executed every other pixel from a macro viewpoint. In this manner, the image quality of the highlight portion can be improved.

Figure 7:
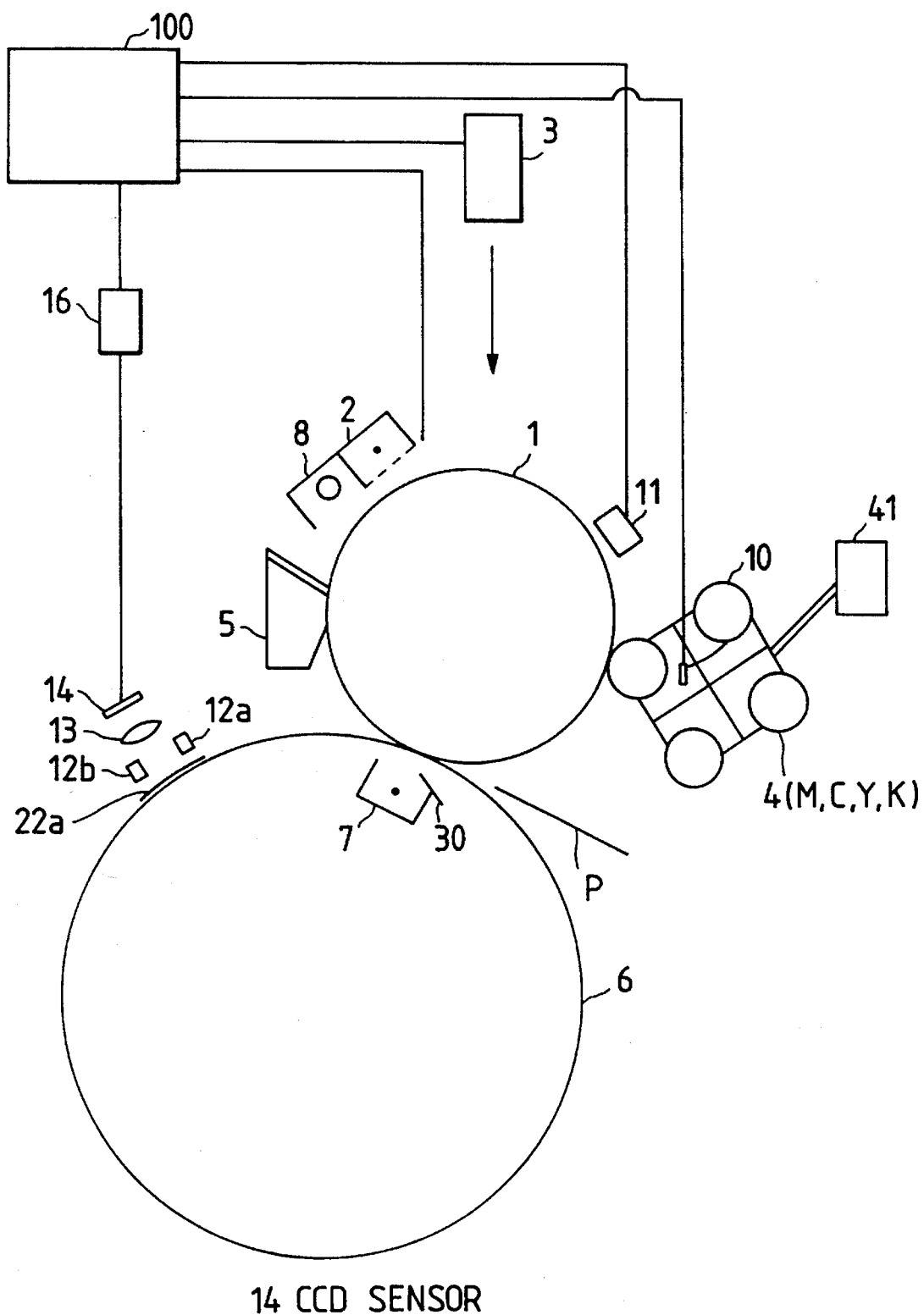
FIG. 7 is a diagram for explaining the reading operation of a patch pattern in the image forming apparatus according to the invention.

The image forming apparatus of the single drum type described in the above embodiment has been described with respect to the case where the patch 22a formed on the photosensitive drum 1 is irradiated by the light sources 12a, 12b, and the like and their reflected lights are read by the CCD sensor 14, thereby analyzing the line width distribution status. However, if the photosensitive drum 1 is exposed for a process other than the image formation, the lifetime of the drum 1 is reduced. To prevent such a problem, it is also possible to use a construction such that after the patch 22a was transferred to the transfer drum 6, the CCD sensor 14 reads the patch 22a at a position shown in FIG. 7.

Figure 8:
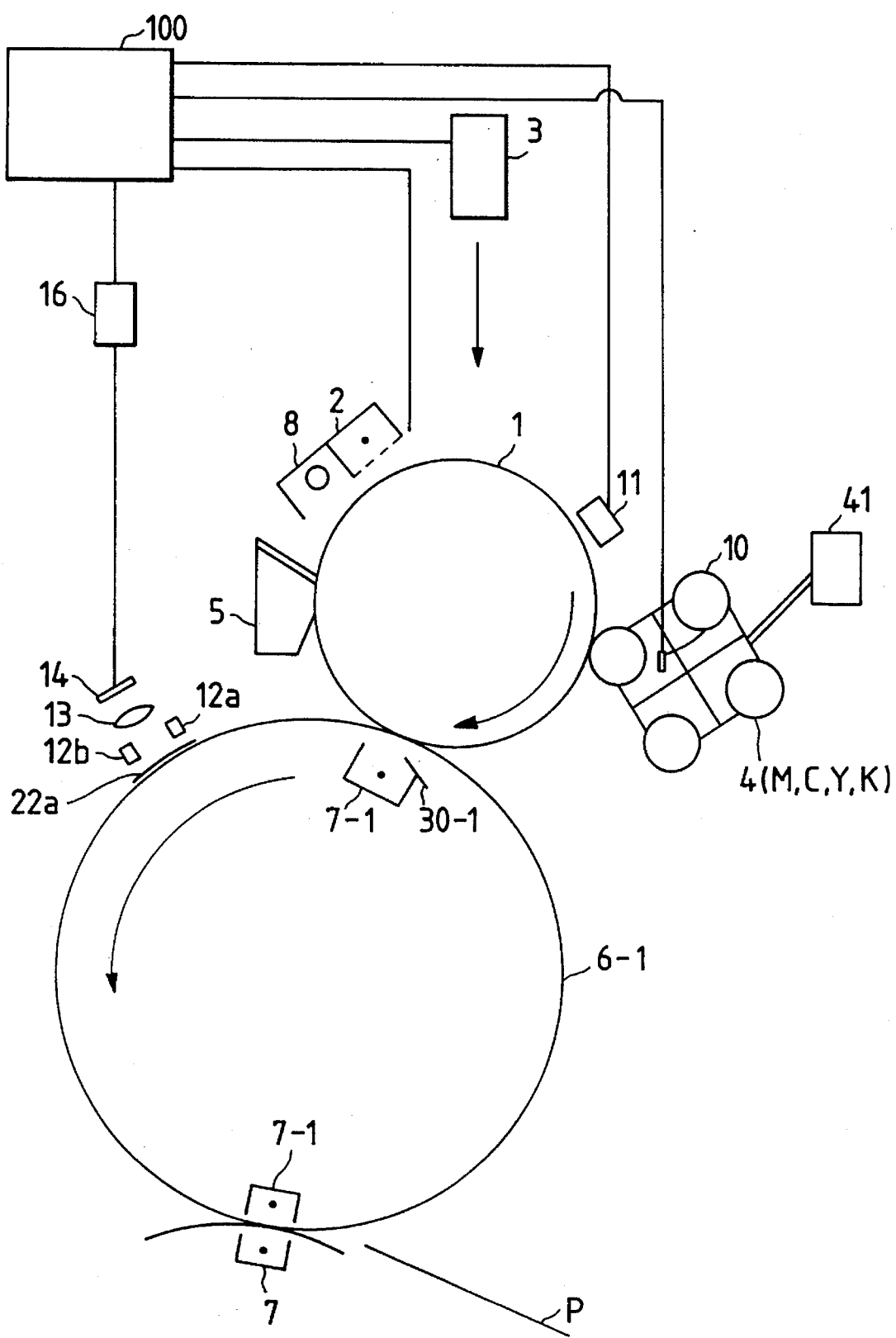
FIG. 8 is a diagram for explaining the reading operation of a patch pattern in the image forming apparatus according to the invention.

On the other hand, as shown in FIG. 8, in case of an image forming apparatus with a construction such that the transfer drum 6 is used as an intermediate transfer drum and yellow, magenta, cyan, and black images which are sequentially formed on the photosensitive drum 1 are overlaid and transferred onto a transfer drum 6-1 and the images transferred onto the transfer drum 6-1 are transferred onto the recording material P in a lump, it is effective to detect the modulation transfer function of the image on the transfer drum 6-1 because it is in a state near the final image. However, it is necessary to control so as to generate the data of the test patch of each color at a timing such that the test patch of each color doesn't overlap on the intermediate transfer material. Reference numeral 7-1 denotes a transfer charging unit similar to the transfer charging unit 7.

Third Embodiment

Figure 9:
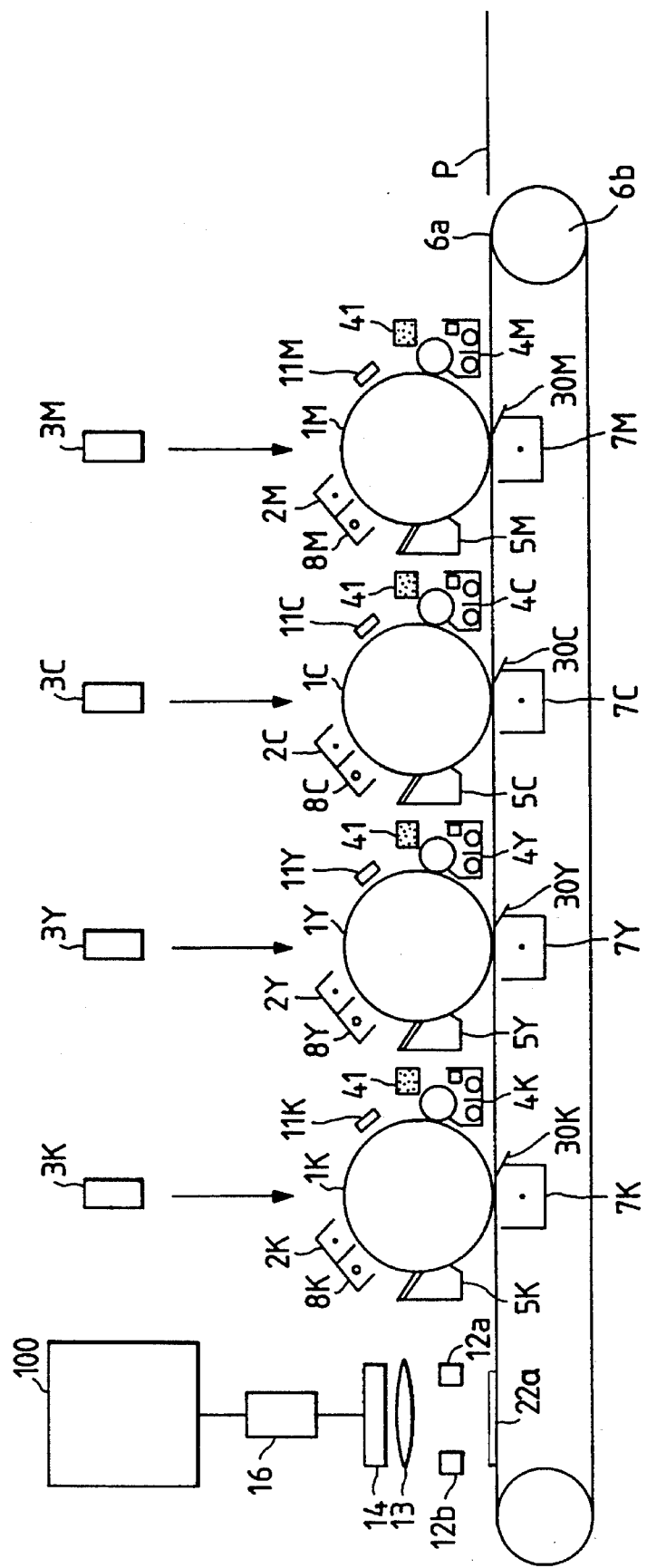
FIG. 9 is a cross sectional constructional diagram of a main section for explaining a construction of an image forming apparatus showing the third embodiment of the invention.

FIG. 9 is a cross sectional constructional diagram of a main section for explaining a construction of an image forming apparatus showing the third embodiment of the invention. The same portions as those shown in FIG. 1 are designated by the same reference numerals. Different from the image forming apparatus shown in the first embodiment, the third embodiment shows the case of a color image forming apparatus of the 4-drum type in which an image station to form an image is arranged in parallel every color of yellow, magenta, cyan, and black.

In the diagram, reference numeral 6a denotes a transfer belt serving as transfer material conveying means which is conveyed at a predetermined speed by the driving of a driving roller 6b. Reference numeral 1M denotes a photosensitive drum for magenta comprising: a discharging lamp 8M; a charging unit 2M; a potential sensor 11M; a developing unit 4M; a toner density sensor 10M; a transfer charging unit 7M; a cleaner 5M; a transfer pressing member 30M; and the like. Reference numeral 1C denotes a photosensitive drum for cyan comprising: a discharging lamp 8C; a charging unit 2C; a potential sensor 11C; a developing unit 4C; a toner density sensor 10C; a transfer charging unit 7C; a cleaner 5C; a transfer pressing member 30C; and the like. Reference numeral 1Y denotes a photosensitive drum for yellow comprising: a discharging lamp 8Y, a charging unit 2Y; a potential sensor 11Y; a developing unit 4Y; a toner density sensor 10Y; a transfer charging unit 7Y; a cleaner 5Y; a transfer pressing member 30Y; and the like. Reference numeral 1K denotes a photosensitive drum for black comprising: a discharging lamp 8K; a charging unit 2K; a potential sensor 11K; a developing unit 4K; a toner density sensor 10K; a transfer charging unit 7K; a cleaner 5K; a transfer pressing member 30K; and the like.

Even in the image forming apparatus with such a construction, it is possible to judge whether the image forming state is good or not on the basis of the MTF obtained by detecting the patch 22a of each color. Thus, the image forming state can be corrected as shown in each of the above embodiments.

Fourth Embodiment

Figure 10:
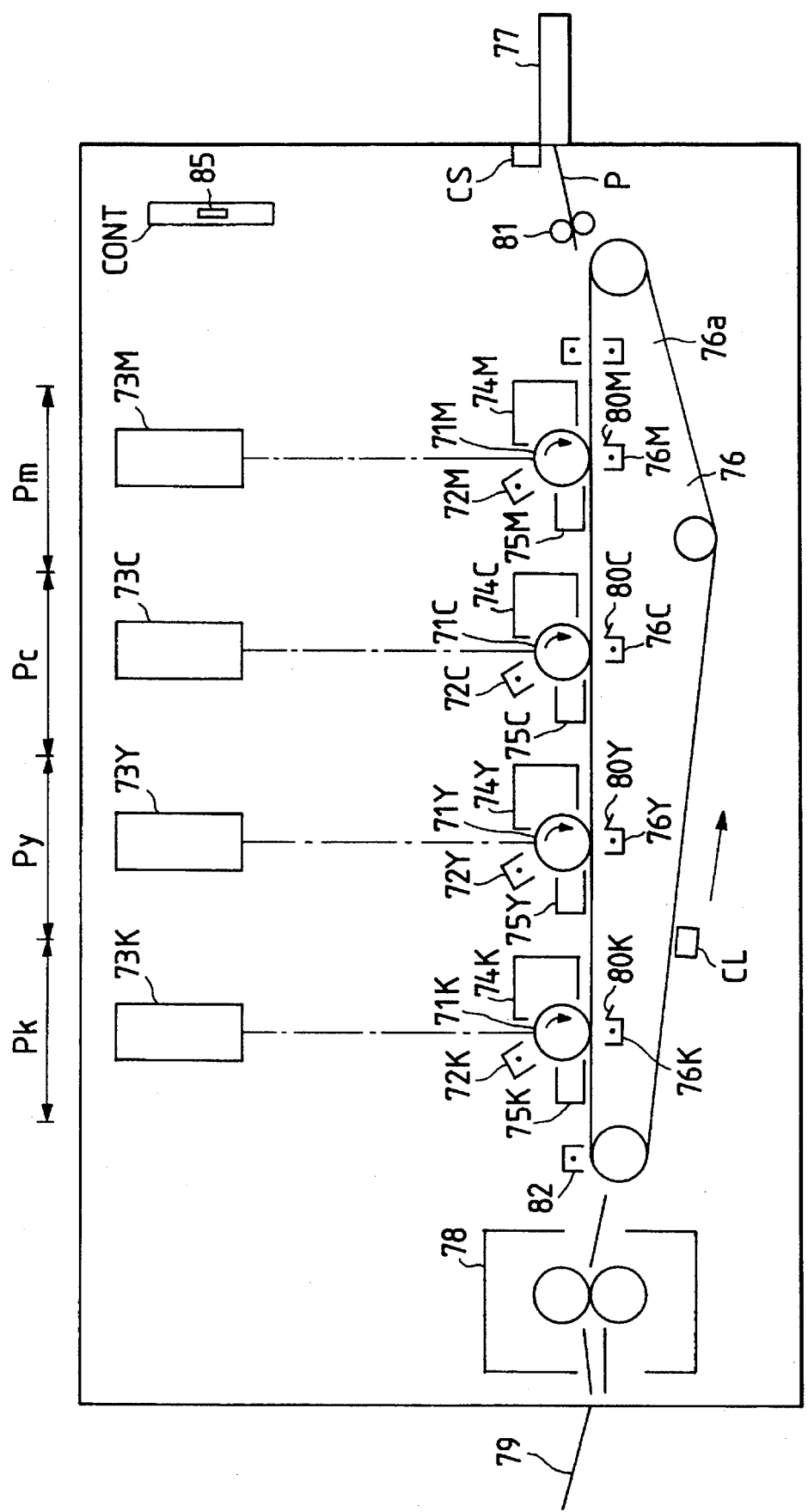
FIG. 10 is a cross sectional constructional view for explaining a construction of an image forming apparatus showing the fourth embodiment of the invention.

FIG. 10 is a cross sectional constructional diagram for explaining a construction of an image forming apparatus showing the fourth embodiment of the invention and shows the case of, for example, a digital color image forming apparatus of the 4-drum laser beam type. The construction and the operation of each section will be described hereinbelow.

According to the apparatus, four image forming stations which are constructed around an electrophotographic photosensitive material so as to have image forming means are provided in correspondence to the image forming colors, respectively. The toner image on the photosensitive material formed by each image forming station is transferred onto the transfer material which is conveyed by a belt-like moving material which is moved so as to face the photosensitive material. Photosensitive drums 71M, 71C, 71Y, and 71K are arranged for image forming stations Pm, Pc, Py, and Pk of magenta, cyan, yellow, and black and are rotated in the directions shown by arrows (clockwise direction). Primary charging units 72M, 72C, 72Y, and 72K, scanning optical apparatuses (laser scanners) 73M, 73C, 73Y, and 73K serving as scanning means, developing apparatuses 74M, 74C, 74Y, and 74K, and cleaning apparatuses 75M, 75C, 75Y, and 75K are arranged around the photosensitive drums 71M, 71C, 71Y, and 71K, respectively.

The recording medium, for example, the transfer material P passes from a paper feed cassette 77 through recording material detecting means 81 and is fed to a copy transfer section 76. Further, the transfer section 76 constructing one image forming means has a transfer belt (conveying belt) 76a which is used commonly in each image forming station and charging units 76M, 76C, 76Y, and 76K for transfer for the drums. The toner images of the respective colors formed on the photosensitive drums 71M, 71C, 71Y, and 71K are sequentially overlaid on the transfer material P indicated on the transfer belt 76a and are transferred, so that a full color image is formed. The transfer paper P is fed out from the paper feed cassette 77. The transfer material P after completion of the transfer step is separated from the transfer belt 76a and is delivered onto a tray 79 through a fixing unit 78. Reference numeral 82 denotes a patch density sensor for optically reading the patch image transferred onto, for example, the transfer belt 76a and for generating density information to a controller 85 of an image formation control unit CONT. In the embodiment, the image forming means is constructed by the above photosensitive drum, developing apparatus, scanning optical apparatus, primary charging unit, and the like and forms a density patch for judging an image density state onto the conveying belt 76a or recording medium on the basis of the density patch data which is stored into an internal memory of the controller 85 of the image formation control unit CONT. Reference numerals 80M, 80C, 80Y, and 80K denote transfer charging units.

Each of the scanning optical apparatuses 73M, 73C, 73Y, and 73K comprises: a laser light source as a light source (not shown); a rotary polygon mirror for scanning a laser beam from the laser light source; an fθ lens for converging the scanning beam onto a base line of the surface of the photosensitive drum; a reflecting mirror for deflecting the laser beam; and a beam detector for detecting a specific position of the scanning beam. CS denotes a cassette sensor for detecting the presence or absence of a recording medium which is enclosed into the paper feed cassette 77 and for generating an output signal to the image formation control unit CONT. CL denotes a cleaning mechanism.

The image formation control unit CONT in the diagram monitors various kinds of sensor outputs and sets and controls the image forming conditions so that the optimum image can be formed.

Figure 11:
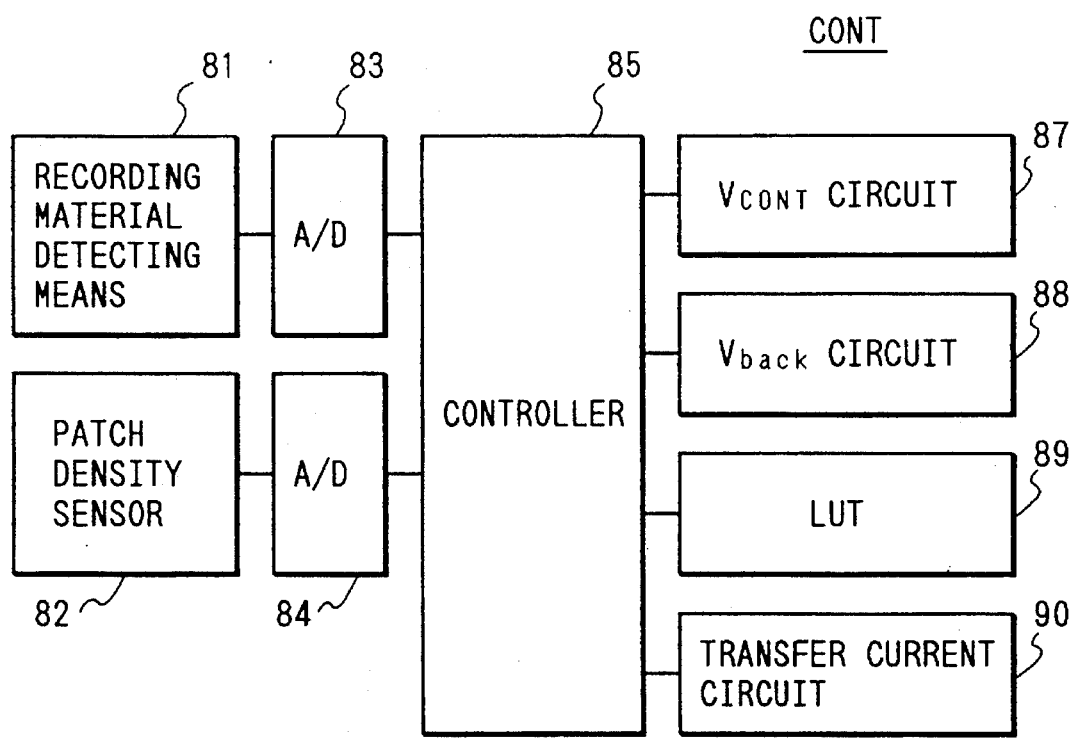
FIG. 11 is a control block diagram showing a construction of a main section of an image formation control section shown in FIG. 10.

FIG. 11 is a control block diagram showing a construction of a main section of the image formation control unit CONT shown in FIG. 10.

In the diagram, reference numeral 82 denotes the patch density sensor for detecting a density of patch transferred onto the transfer belt 76a, for example, on the downstream side than the black image forming station as an image forming station on the downstream side and for notifying a detection signal to the controller 85 through an A/D converter 84. Reference numeral 83 denotes an A/D converter for A/D converting the voltage value or current value measured by the recording material detecting means 81 and for notifying the converted digital value to the controller 85. Reference numeral 87 denotes a contrast potential setting circuit for adjusting the surface potential of each photosensitive material in accordance with the contrast potential which was determined by the controller 85 on the basis of a difference between the developing bias potential and the potential of the bright portion. Reference numeral 88 denotes a back potential setting circuit for adjusting a light amount of laser beam in accordance with a back potential which was determined by the controller 85 on the basis of a difference between the developing bias potential and the potential of the dark portion of the photosensitive material. Reference numeral 89 denotes a lookup table for adjusting a density level so as to set gradation characteristics of the image to be linear. Reference numeral 90 denotes a transfer current circuit for converting the voltage value or current value measured by the recording material detecting means 81 into the digital value and for deciding transfer currents which are supplied to the transfer charging units 76M, 76C, 76Y, and 76K so as to obtain the optimum charging levels in accordance with the notified recording material information.

Figure 12:
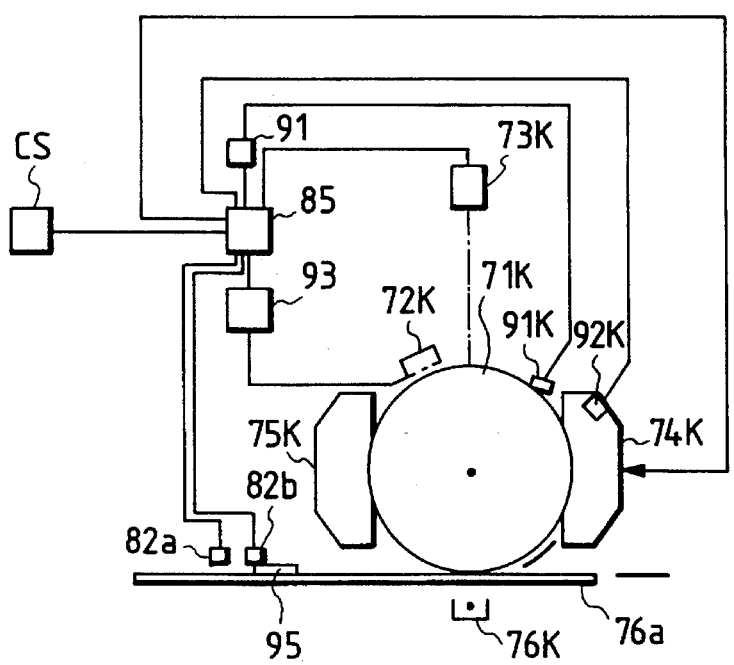
FIG. 12 is a diagram for explaining an image density control construction of a black station of the image forming apparatus shown in FIG. 10.

FIG. 12 is a diagram for explaining an image density control construction of the black station of the image forming apparatus shown in FIG. 10. The same portions as those shown in FIG. 10 are designated by the same reference numerals.

In the diagram, reference numeral 91 denotes a potentiometer which generates the surface potential (potential of the bright portion, potential of the dark portion, residual potential, etc.) of the photosensitive material detected by a potential sensor 91K as potential data to the controller 85. Reference numeral 92K denotes a density sensor for detecting a toner density in the developing device 74K, and 93 indicates a power source of the primary charging unit 72K.

When the surface potential of the photosensitive drum 71K is detected from the potential sensor 91K and the potential data is generated from the potentiometer 91, the controller 85 sets the bright portion potential of the photosensitive drum 71K so as to obtain a plurality of predetermined bright portion potential data with reference to the generated potential data. That is, the controller 85 adjusts a light amount of the laser beam which is irradiated from the laser scanner 73K. Latent images to form a test patch 95 are sequentially formed on the photosensitive drum 71K by the laser scanner 73K every plurality of set bright portion potentials. The latent image of each test patch is developed by the developing unit 74K and is transferred onto the conveying belt 76a. Each test patch image density which was transferred to the conveying belt 76a is read by a photodetector 82a of the patch density sensor 82 and a light source 82b. A light amount level signal is fed back to the controller 85.

The image forming condition setting control operation in the image forming apparatus according to the invention will now be described hereinbelow with reference to a flowchart shown in FIG. 13.

Figure 13:
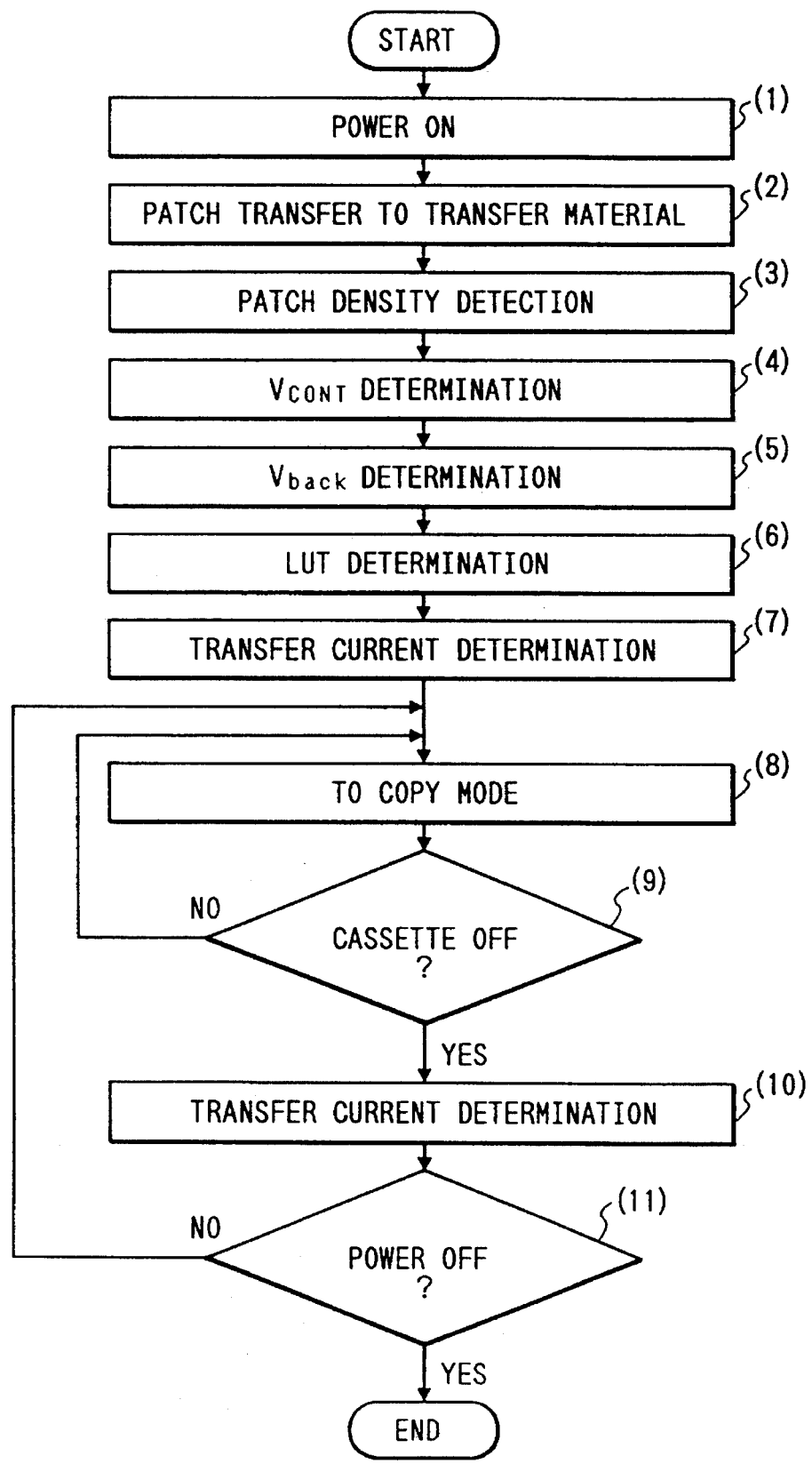
FIG. 13 is a flowchart showing an example of a control procedure for setting image forming conditions in the image forming apparatus according to the invention.

FIG. 13 is the flowchart showing an example of a control procedure for setting the image forming conditions in the image forming apparatus according to the invention. (1) to (11) denote processing steps.

When the power source is turned on for the first time in a day (1) in order to use the apparatus main body, the latent image of the test patch 95 is formed on the photosensitive drum 71K in accordance with the standard conditions and the latent image is developed by the developing unit 74K and is transferred onto the transfer material P fed out from the cassette 77 in order to stabilize the picture quality in the image formation in the day (2). The density is subsequently detected by the patch density sensor 82 (3). The patch density output data is supplied to the controller 85 through the A/D converter 84. In the test patch 95 constructing the density patch, total five gradation patches of 20H, 40H, 80H, A0H, and FFH among the FFH (hexa) gradations are formed under preset reference conditions. With respect to each of yellow, magenta, and cyan, five gradation patches are also similarly formed and the density is measured. As a material of the transfer means which is used in the embodiment, a material of the polyurethane system, polycarbonate system, PVdF (polyvinylidene fluoride), or the like can be used. As a toner, a toner such that a mean particle diameter lies within a range from 3 to 20 μm and a coloring pigment is dispersed into a polyester resin and silica is coated as an external addition agent is used. In accordance with the color of the toner or the like, a styrene-acrylic system resin can be used.

As a colorant, carbon black, a benzene system yellow pigment, an anthraquinone system dye, a copper phthalocyanine system dye, or the like can be also used.

A contrast potential Vcont corresponding to a difference between the developing bias potential and the bright portion potential is decided (4) so as to set the maximum density Dmax which is obtained from the patch densities fetched to the controller 85 to a predetermined value as mentioned above. The controller 85 sets the set value into the controller potential setting circuit 87.

Subsequently, a back potential Vback corresponding to a difference between the developing bias potential and the dark portion potential is decided in order to improve the reproducibility of the highlight portion (5). The controller 85 sets the set value into the back potential setting circuit 88. Subsequently, data of the lookup table 89 is determined in order to correct the gradation characteristics so as to become linear (6). The value of the transfer current to accomplish a proper transfer efficiency is decided on the basis of the detection result of the recording material detecting means 81 (7). The controller 85 sets the transfer current value to the transfer current circuit 90. After completion of the picture quality stabilizing operation in steps (1) to (6), the transfer material is delivered as a test mode to the outside of the apparatus. The copy counting operation in this instance is not executed. After that, the apparatus enters the copy mode (8) and the ordinary copying operation can be performed. Whether the paper feed cassette 77 has been removed from the main body or not is judged from a detection output of the cassette sensor CS (9). If NO, the processing routine is returned to step (8). If YES, it is determined that the papers (for example, wrapped by a sheet which was treated so as to prevent from the moisture) which were newly released from a paper pack whose moisture state is different from that of the papers which had been fed so far are newly supplied into the cassette. Thus, the process to decide the transfer current is again executed (10), thereby activating the correction of the transfer efficiency. A check is now made to see if the power source has been turned off or not (11). If NO, the processing routine is returned to step (8). If YES, the processes are finished.

As mentioned above, the paper supply timing (change timing of the hygroscopic state of the transfer material) to the paper feed cassette 77 is captured and the transfer efficiency can be corrected. The stable picture quality can be always obtained.

It is also possible to control the paper conveyance in the following manner. Namely, at the time of the first copy just after the new papers having a different hygroscopic state were supplied into the paper feed cassette 77, as an operation to correct the transfer efficiency, the test patch of each color is directly formed on the paper and the density is read by the patch density sensor 82. The transfer current is controlled on the basis of the resultant density. After that, the paper is cleaned by the cleaning mechanism CL with the paper adsorbed to the transfer belt 76a. After that, the operation is returned to the first station and the paper is again fed at a predetermined feed timing.

Due to this, a desired image can be formed from the first paper just after the paper supplement at a picture quality of a proper transfer efficiency without consuming the papers in vain.

In the case where the image forming apparatus main body has a mechanism which can manually insert the paper, when a mode to manually feed a post card, an OHP sheet, or the like is set, the paper conveyance can be also controlled in the following manner. That is, the above transfer efficiency correcting process is forcedly executed, the test patch 95 is directly formed onto the paper which was manually inserted and is transferred. After that, it is read by the patch density sensor 82 and the transfer current is controlled on the basis of the result. After that, the paper is cleaned by the cleaning mechanism CL with the paper adsorbed to the transfer belt 76a. After that, the operation is returned to the first station and the paper is again fed at a predetermined paper feed timing. Due to this, since the image formation is started in a state in which the image forming conditions are set so as to obtain the optimum transfer efficiency every various kinds of recording media which are manually inserted, a desired image can be formed at a picture quality of a proper transfer efficiency corresponding to the kind of paper which is manually inserted (such papers are limited to only the papers which can be manually fed and inserted).

Figure 14:
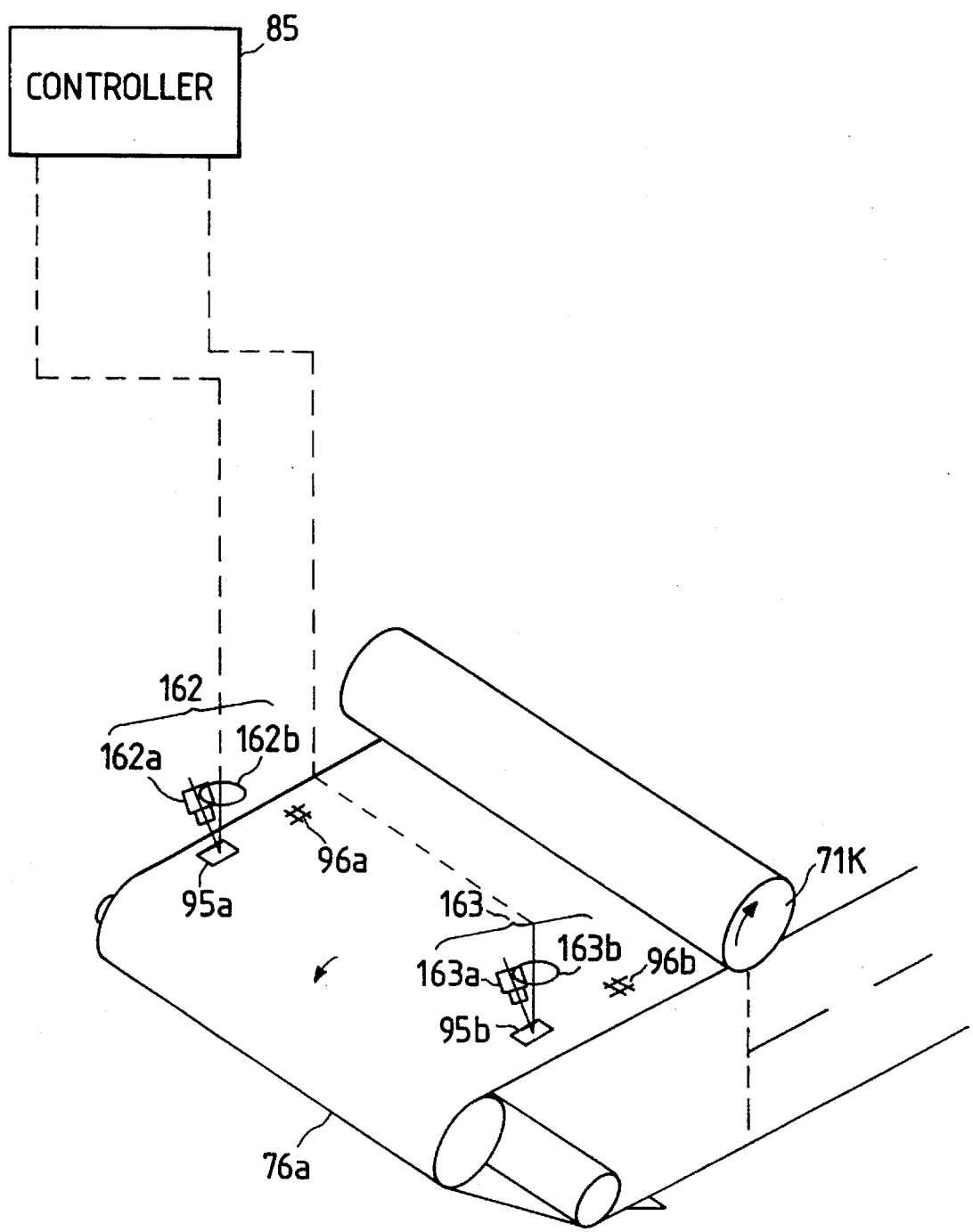
FIG. 14 is a perspective view of a main section for explaining another patch image detecting mechanism in the image formation according to the invention.

As shown in FIG. 14, it is also possible to use a construction such that the function of the patch density sensor 82 is commonly provided for a resist sensor 162 (comprising a photodetector 162a and a light source 162b) and a resist sensor 163 (comprising a photodetector 163a and a light source 163b) which are provided in the image forming apparatus of the 4-drum type. In this case, since the resist sensors 162 and 163 detect a resist deviation in the drum axial direction of the photosensitive drum 71K, resist correction marks 96a and 96b are formed in an edge portion of the conveying belt 76a (in the width direction). Therefore, the test patches 95 are also transferred as test patches 95a and 95b in the edge portion of the conveying belt 76a (width direction). In this instance, there is a case where a density variation exists in the formed patches due to a conveyance fluctuation of the developing agent in the developing unit or the like. To prevent such a problem, it is also possible to perform a predetermined correction arithmetic operation to the read image information of the test patches 95a and 95b and to fetch the corrected information as one density signal into the controller 85 and to execute the control.

Further, in case of directly transferring the test patches 95a and 95b onto the transfer belt 76a, there is a situation such that the read image is influenced by a difference of the surface state of the transfer belt 76a. For example, when there is a scratch or the like on the surface of the transfer belt 76a, the data cannot be correctly read. Therefore, by controlling the timing to form the test patches so that the positions at which the test patches 95a and 95b are directly transferred are set to the same position on the transfer belt 76a, the above adverse influence can be eliminated.

There is also a situation such that the image cannot be read as a density in dependence on the kind of toner which is used. For example, since the black toner containing carbon black absorbs the near infrared light, there occurs a situation such that even if the test patch of black is read, it is not output as a density signal. Therefore, in such a case, an undercolor transfer is previously performed to the regions where the test patches 95a and 95b are formed in the image forming station of black by the image forming station locating on the upstream side than the black station, namely, by the image forming station of either one of magenta, cyan, and yellow. Consequently, the test patches 95a and 95b can be detected in the image forming station of black. Namely, a patch of black is formed on the patch of either one of magenta, cyan, and yellow.

Further, each of the above embodiments has been described with respect to the case where the test patches 95a and 95b are transferred to the transfer belt 76a or the paper serving as a recording medium and the transferred test patches 95a and 95b are read and the density level is adjusted. However, it is also possible to construct in a manner such that the test patches are directly read on the photosensitive drum 71M, 71C, 71Y, or 71K of each image forming station on which the test patches 95a and 95b are developed.

The present invention is not limited to the foregoing embodiments but many modifications and variations are possible within the spirit and scope of the appended claims of the invention.

What is claimed is:

1. An image forming apparatus comprising:

image forming means for forming an image onto a recording medium;

generating means for generating pattern data to form an image of a stripe pattern of a predetermined interval by said image forming means;

reading means for reading said stripe pattern image which is formed by the image forming means in accordance with the pattern data which is generated from said generating means;

memory means for storing the stripe pattern image read by said reading means;

detecting means for detecting the interval of the stripes of said stripe pattern stored in said memory means; and control means for controlling said image forming means on the basis of the interval of the stripes detected by said detecting means.

2. An apparatus according to claim 1, wherein said control means controls said image forming means on the basis of a deviation of the intervals of a plurality of stripes which are detected by said detecting means.

3. An apparatus according to claim 1, wherein said image forming means has developing means for developing a latent image which is formed on said recording medium by a developing agent, and said control means controls the supply of an external addition agent of the developing agent to said developing means.

4. An apparatus according to claim 1, wherein said image forming means forms a color image by synthesizing images of a plurality of color components, and said control means controls said image forming means for each of said plurality of color components.

5. An apparatus according to claim 4, wherein said image forming means forms images of the stripe pattern for each of said plurality of color components.

6. An image forming apparatus comprising:

image forming means for forming an image onto a recording medium;

reading means which is provided so as to face said recording medium and is constructed by a plurality of reading device and reads the image formed on the recording medium; and control means for allowing an image of a stripe pattern of a period longer than a width of said one reading device of said reading means to be formed onto the recording medium, for allowing said reading means to read the image formed, and for controlling operating conditions of said image forming means when forming another image on the basis of the read image.

7. An apparatus according to claim 6, wherein said control means controls the operating conditions of said image forming means on the basis of an interval of the stripes of the stripe pattern image which was read by said reading means.

8. An apparatus according to claim 6, wherein said image forming means forms a color image by synthesizing images of a plurality of color components, and said control means controls the operating conditions of said image forming means for each of said plurality of color components.

9. An apparatus according to claim 8, wherein said image forming means forms images of the stripe patterns for each of said plurality of color components.

10. An image forming apparatus comprising:

enclosing means for enclosing a plurality of recording sheets;

image forming means for forming the image onto the recording sheet fed from said enclosing means;

detecting means for detecting a density of the image formed on the recording sheet;

control means for executing a control operation in a manner such that a test image is formed onto the recording sheet by the image forming means and a density of the test image is detected by the detecting means and the image forming means is controlled on the basis of the detected density; and judging means for judging whether the recording sheet has been supplied into said enclosing means or not, on the basis of a change of a setting status of said enclosing means for said image forming apparatus, wherein said control means executes said control operation when said judging means judges that the recording sheet was supplied.

11. An apparatus according to claim 10, wherein said judging means judges that the recording sheet was supplied by detecting that said enclosing means had been removed from said image forming apparatus.

12. An apparatus according to claim 10, wherein said image forming means forms a color image by synthesizing images of a plurality of color components, and said control means controls said image forming means for each of said plurality of color components.

13. An apparatus according to claim 12, wherein said control means allows said image forming means to form test images for each of said plurality of color components.

14. An apparatus according to claim 10, further having:

cleaning means for cleaning the test image formed on said recording sheet; and conveying means for conveying the recording sheet cleaned by said cleaning means in order to form a new image.

15. An image forming method comprising the steps of:

forming an image onto a recording medium;

generating pattern data to form an image of a stripe pattern of a predetermined interval in the image forming step;

reading said stripe pattern image which is formed by the image forming means in accordance with the pattern data which is generated in the generating step;

storing the stripe pattern image read in the reading step;

detecting the interval of the stripes of said stripe pattern stored in said storing step; and controlling image forming of the forming step on the basis of the interval of the stripes detected in the detecting step.

16. The method according to claim 15, wherein said controlling step controls said image forming on the basis of a deviation of the intervals of a plurality of stripes which are detected in said detecting step.

17. The method according to claim 15, wherein said image forming step includes the step of developing a latent image which is formed on a recording medium by a developing agent, and said controlling step controls the supply of an external addition agent of the developing agent in said developing step.

18. A method according to claim 15, wherein said image forming step forms a color image by synthesizing images of a plurality of color components, and said controlling step controls said image forming step for each of said plurality of color components.

19. A method according to claim 18, wherein said image forming step forms images of the stripe pattern for each of said plurality of color components.

20. An image forming method comprising the steps of:

forming an image onto a recording medium;

reading the image formed on the recording medium; and controlling an image of a stripe pattern of a period longer than a width of a reading device used in the reading step to be formed onto the recording medium, controlling said leading device to read the image formed, and for controlling operating conditions of said image forming step when forming another image on the basis of the read image.

21. A method according to claim 20, wherein in the controlling step the operating conditions of said image forming step on the basis of an interval of the stripes of the stripe pattern image which was read in said reading step.

22. A method according to claim 20, wherein said image forming step forms a color image by synthesizing images of a plurality of color components, and in the controlling step the operating conditions of said image forming step for each of said plurality of color components.

23. A method according to claim 22, wherein said image forming step forms images of the stripe patterns for each of said plurality of color components.

24. An image forming method comprising the steps of:

enclosing a plurality of recording sheets;

forming the image onto the recording sheet fed in said enclosing step;

detecting a density of the image formed on the recording sheet;

controlling an execution of a control operation in a manner such that a test image is formed onto the recording sheet in the image forming step and a density of the test image is detected and the image forming step is controlled on the basis of the detected density; and judging whether the recording sheet has been supplied in said enclosing step or not, wherein in the controlling step said control operation is executed when said judging step judges that the recording sheet was supplied.

25. A method according to claim 24, wherein said image forming step forms a color image by synthesizing images of a plurality of color components, and said controlling step controls said image forming step for each of said plurality of color components.

26. A method according to claim 25, wherein said controlling step allows said image forming step to form test images for each of said plurality of color components.

27. A method according to claim 24, further comprising the steps of:

cleaning the test image formed on said recording sheet; and conveying the recording sheet cleaned in said cleaning step in order to form a new image.

* * * * *

UNITED STATES PATENT AND TRADEMARK OFFICE
CERTIFICATE OF CORRECTION

PATENT NO. : 5,481,340
DATED : January 2, 1996
INVENTOR(S) : Yoshinori Nagao, et al.

It is certified that error appears in the above-indentified patent and that said Letters Patent is hereby corrected as shown below:

Title Page
  Item [57] Abstract, line 2, "comprises" should read --includes--.

COLUMN 12

Line 51, "device" should read --devices--.

COLUMN 14

Line 18, "leading " should read --reading--; and
  Line 24, between "step" and "on the basis", please insert --are controlled--.

Signed and Sealed this

Twenty-first Day of May, 1996

Attest:

BRUCE LEHMAN

Attesting Officer                Commissioner of Patents and Trademarks